(12) United States Patent
Smith et al.

(10) Patent No.: US 8,937,530 B2
(45) Date of Patent: *Jan. 20, 2015

(54) RADIO FREQUENCY IDENTIFICATION TAGS ADAPTED FOR LOCALIZATION AND STATE INDICATION

(75) Inventors: Joshua R. Smith, Seattle, WA (US); Daniel Yeager, Seattle, WA (US); Ali Rahimi, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,591

(22) Filed: Jan. 13, 2012

(65) Prior Publication Data

US 2012/0105210 A1    May 3, 2012

Related U.S. Application Data

(63) Continuation of application No. 11/967,326, filed on Dec. 31, 2007, now Pat. No. 8,222,996.

(51) Int. Cl.

| | |
|---|---|
| *H04Q 5/22* | (2006.01) |
| *G08B 13/14* | (2006.01) |
| *H04R 27/00* | (2006.01) |
| *G06K 9/00* | (2006.01) |
| *G06F 19/00* | (2011.01) |
| *G06K 19/07* | (2006.01) |
| *G06K 19/077* | (2006.01) |
| *G06K 17/00* | (2006.01) |

(52) U.S. Cl.
CPC ...... *G06K 19/0723* (2013.01); *G06K 19/07703* (2013.01); *G06K 2017/0051* (2013.01)

USPC ............... 340/10.1; 340/572.1; 340/815.4; 340/815.42; 381/82; 382/107; 235/385; 235/400; 348/207.99

(58) Field of Classification Search
CPC .......... G06K 7/10336; G06K 7/10346; G06K 7/0008; G06K 7/10099; G06K 7/10217
USPC .......................................................... 340/10.1
See application file for complete search history.

(56) References Cited

U.S. PATENT DOCUMENTS

| | | | |
|---|---|---|---|
| 5,793,630 A | 8/1998 | Theimer et al. | |
| 5,920,287 A * | 7/1999 | Belcher et al. | ............... 342/450 |
| 6,130,417 A | 10/2000 | Hashimoto | |
| 6,603,865 B1 | 8/2003 | Yagi et al. | |
| 7,009,561 B2 | 3/2006 | Menache et al. | |
| 7,233,250 B2 | 6/2007 | Forster | |
| 7,362,228 B2 * | 4/2008 | Nycz et al. | ............... 340/572.1 |

(Continued)

OTHER PUBLICATIONS

Notice of Allowance Received for U.S. Appl. No. 11/967,326, mailed on Apr. 2, 2012, 11 pages.

(Continued)

*Primary Examiner* — Fekadeselassie Girma
(74) *Attorney, Agent, or Firm* — Ellis B. Ramirez; Prass LLP

(57) ABSTRACT

An embodiment of the present invention provides a radio frequency identification (RFID) tag, comprising at least one light emitting diode (LED) that is controlled by the RFID's logic and powered by the RFID's power harvesting circuit, wherein the RFID tag is capable of being interrogated by an RFID reader and reporting its unique identification number by RF backscatter and/or controlling the illumination state of the at least one LED.

15 Claims, 3 Drawing Sheets

(56) References Cited

U.S. PATENT DOCUMENTS

| | | |
|---|---|---|
| 7,719,429 B2 * | 5/2010 | Barber et al. .............. 340/573.2 |
| 7,760,094 B1 * | 7/2010 | Kozischek et al. ........ 340/572.1 |
| 7,889,082 B2 * | 2/2011 | Bauchot et al. ............ 340/572.1 |
| 8,222,996 B2 * | 7/2012 | Smith et al. ................... 340/10.1 |
| 2002/0085097 A1 * | 7/2002 | Colmenarez et al. ......... 348/211 |
| 2003/0045816 A1 | 3/2003 | Foxlin |
| 2003/0095186 A1 | 5/2003 | Aman et al. |
| 2003/0137400 A1 * | 7/2003 | Heinrich et al. ............. 340/7.32 |
| 2003/0193572 A1 | 10/2003 | Wilson et al. |
| 2005/0086227 A1 | 4/2005 | Sullivan et al. |
| 2006/0022824 A1 | 2/2006 | Olsen, III et al. |
| 2006/0059049 A1 | 3/2006 | Morris et al. |
| 2006/0164541 A1 | 7/2006 | Olmstead et al. |
| 2007/0017983 A1 * | 1/2007 | Frank et al. .................... 235/385 |
| 2007/0023512 A1 * | 2/2007 | Miller et al. ................... 235/385 |
| 2008/0220721 A1 * | 9/2008 | Downie et al. ............... 455/41.3 |
| 2010/0111489 A1 | 5/2010 | Presler |

OTHER PUBLICATIONS

Office Action Received for U.S. Appl. No. 11/967,326, mailed on Nov. 16, 2011, 10 pages.
Office Action Received for U.S. Appl. No. 11/967,326, mailed on Jun. 22, 2011, 12 pages.

* cited by examiner

RADIO FREQUENCY IDENTIFICATION TAGS ADAPTED FOR LOCALIZATION AND STATE INDICATION

The present application is a continuation of and claims the benefit of U.S. patent application Ser. No. 11/967,326, filed on Dec. 31, 2007 and titled "RADIO FREQUENCY IDENTIFICATION TAGS ADAPTED FOR LOCALIZATION AND STATE INDICATION", which is incorporated by reference herein.

BACKGROUND

Currently techniques for finding the physical location of an RFID tagged object are very limited. Because RFID antenna fields of view may be quite wide, visibility to an RFID antenna typically provides very imprecise location information. Multipath propagation may lead to inaccurate RF-based location estimates. Furthermore, item location and selection state is not directly perceivable by a human.

Thus, a strong need exists for improvements in RFID systems, methods and apparatus.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
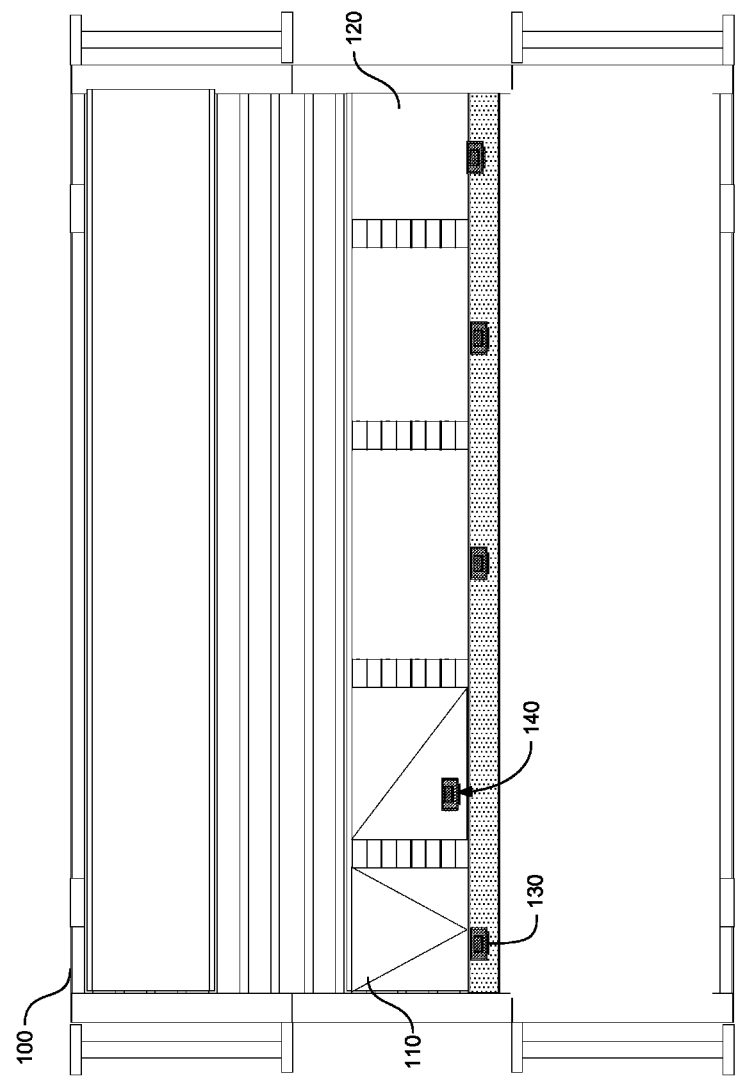
FIG. 1 illustrates two WISPs with LEDs of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As stated above, the current state of the art techniques for finding the physical location of an RFID tagged object are very limited. Because RFID antenna field of view may be quite wide, visibility to an RFID antenna typically provides very imprecise location information. Multipath propagation may lead to inaccurate RF-based location estimates. Furthermore, item location and selection state is not directly perceivable by a human. Embodiments of the preset invention allows a person, robot or inventory/surveillance system to visually locate RFID tagged objects with high precision and accuracy, with no multipath artifacts, and in manner that makes item location and selection state directly perceivable by a human.

An embodiment of the present invention includes a wirelessly-powered, battery-free UHF (915 MHz) RFID tag with one or more LEDs (light emitting diodes) that are controlled by the RFID's logic and powered by its power harvesting circuit, which may include substantial capacitance. It is understood that the present invention is not limited to any particular RFID tag frequency. The device may be interrogated by a standards-compliant RFID reader (it is understood that the RFID tag reader does not necessarily need to be compliant with any particular standard) and can report its unique identification number by RF backscatter (as conventional tags do) or control the illumination state of the attached LEDs. The illumination may be controlled either by an explicit LED-control command from the reader, or locally by the tag, for example indicating tag state such as read/unread, indicating selected/unselected, indicating whether the value a sensor (also attached to the tag) has exceeded a threshold, indicating whether tag ID or other tag memory bits fall within a certain range, and so on.

In an embodiment of the preset invention, the LED may be used to provide visual feedback to a human operator, or to a video camera/machine vision system. The vision system may be mounted on a robot for localization, or in a fixed configuration. The present invention is particularly useful as it allows an RFID tag to be visually located with high precision, even in unlit environments and even when many tags are in close proximity. Using an RFID reader alone, it is not possible to precisely locate a tag because of the non-line-of sight propagation characteristics of RF. Thus when many tags are in close proximity (as for example in a warehouse), the fact that a particular ID tag can be read by the reader may not provide enough help in finding the object. Even a single isolated tag may be hard to localize precisely using an RFID reader alone because of the non-line-of sight propagation characteristics of RF.

In prior art systems, it was generally believed that RFID could not provide enough power to drive an LED; however, embodiments of the preset invention provide techniques that allow the illumination of an LED in the constrained power context of a passive RFID tag.

Operation of an LED typically requires a significant amount of power. Because the required power to drive the LED typically cannot be provided continuously by RFID, hysteresis (implemented in the tag logic) may be used to provide bright duty-cycled illumination, rather than constant brownout. The tag powers the LED when a sufficient operating voltage is reached (Von), which discharges its storage capacitor. When the minimum operating voltage is reached (Voff<Von), the LED is turned off, at which point the storage capacitor recharges. Thus, the LED flashing rate is proportional to the input power, but the brightness of any single flash is constant.

Because of human "persistence of vision," the very short illumination pulses are perceived by humans as much longer flashes. For observation of the LED tags by camera, the camera light collection duty cycle should ideally be set high by setting the shutter time to be as close as possible to the camera frame rate; if this is not done, the short illumination time of the LED may create brightness aliasing artifacts as the camera and LED go in and out of phase with one another.

In another embodiment of the present invention, a pair of stereo cameras may be used to automatically localize the 3D location of the RFID tags that may be associated with something such as a blinking WISP. A blink detection algorithm may locate the LED in both camera views, and stereo triangulation may locate the LED.

Figure 3:
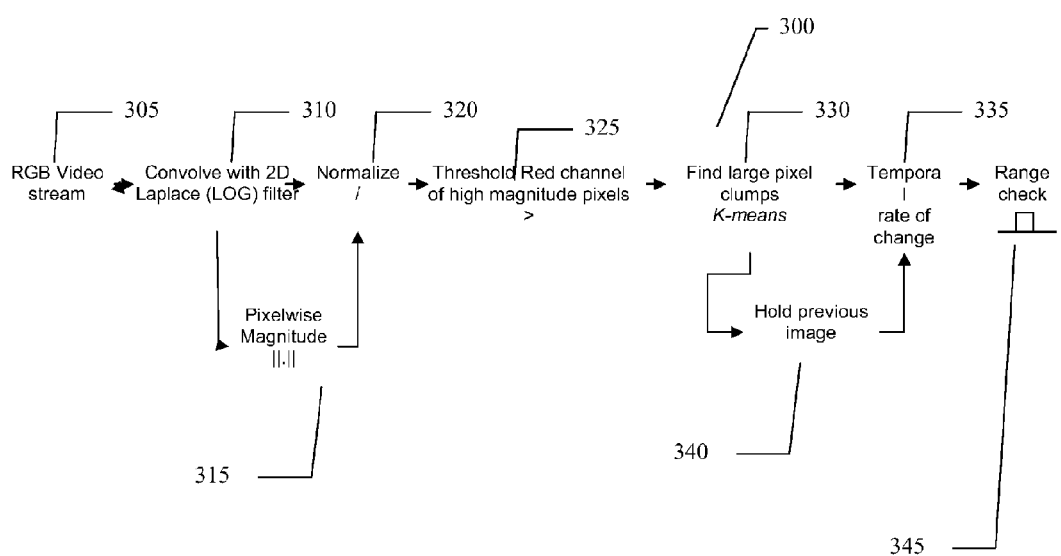
FIG. 3 illustrates a machine vision procedure for finding a flashing LED of an embodiment of the present invention.

As shown generally as 300 of FIG. 3 the flowchart describes an algorithm for locating a small blinking bright red image region. The algorithm can detect LEDs of varying sizes and colors, blinking at variable rates shown as RGB video stream 305. Convolving 310 the images with a 2D "Laplacian of Gaussian" filter accentuates intensity discontinuities and deemphasizes linear or flat regions. Pixelwise Magnitude and normalization are shown at steps 315 and 320 respectively.

The thresholding step 325 ensures that only bright red light sources are considered, and the K-means step 330 ensures that only sufficiently large regions are considered (hold previous image step indicated at 340 and temporal range of change show at 335). The rate range check 345 identifies pixels whose on-off rate is within a given range. This relaxes the requirement that the LED blink at a known fixed frequency.

In a second embodiment of the blink detection, the temporal filtering can be performed first: the image series can be low-pass-filtered to extract the steady component of the scene. Subtracting the low-pass-filtered image from each new frame yields a high pass filtered image stream. Pixels in the high-pass-filtered image stream with consistently high energy are likely to be blinking. Pixels of interest can be identified by applying an energy threshold to the temporally filtered image stream. Then spatial filters such as those described in the previous embodiment can be applied to extract the location of the flashing LED.

Looking back at FIG. 1, generally at 100 are provided two tagged bins 110 and 120 shown side by side. Without the present invention, it would be difficult to determine which bin contains a desired item, because the reader would typically be able to "see" and read both tags since they are in close proximity. The present invention allows a single selected bin to illuminate, even if it is in close proximity to other tagged bins that are not selected, making the selected item easily detectable visually.

Previously, beyond localization, there were no practical methods for a tag to provide state information to a human operator that is directly detectable by the human. If a human operator attempted to read tags 130 and 140 on 10 items simultaneously, but only 9 of the reads are successful, it was difficult for the human to determine which read failed. If the items that had been successfully read were to light LEDs, then it would be immediately obvious to the human which item had not been read.

So in FIG. 1 two embodiments with differing IDs are attached to storage bins 110 and 120. Tag 140 is powering an LED using RFID for power, as instructed by a nearby RFID reader. The other tag 130 is not powering its LED because the RFID reader's tag-specific LED illumination command does not match its ID. These RFID tags may also wirelessly report their unique ID like traditional RFID tags. The command to power a tag's LED is accomplished by requesting a tag with a reader-designated ID (setting mask bits using the EPC Gen 1 standard). This ID may be known, or could be discovered by querying nearby tags for their ID and then selecting an ID for LED illumination.

Figure 2:
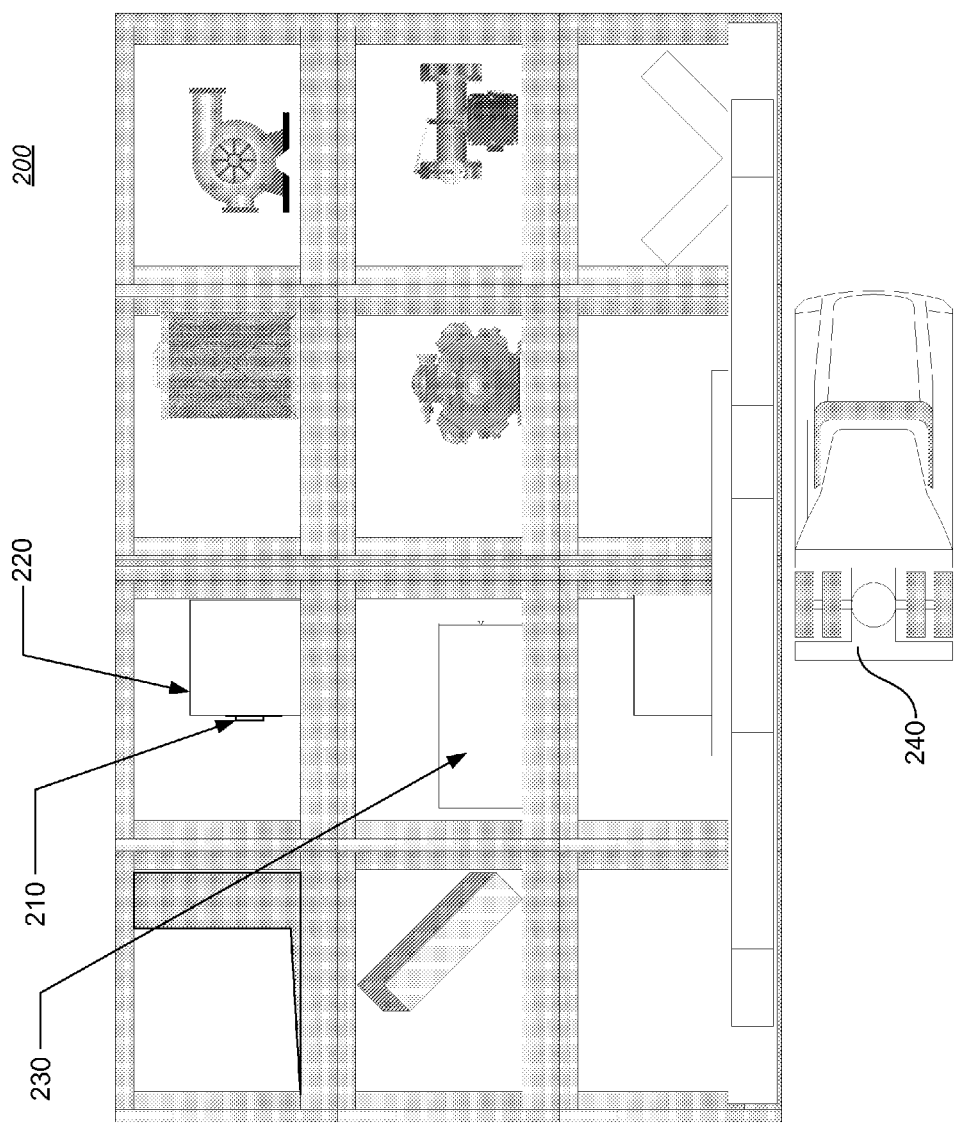
FIG. 2 shows an example localization scenario of an embodiment of the invention.

This illustration continues in FIG. 2 which provides at 200, an example localization scenario of an embodiment of the invention. The location of box 220, distinguished from box 230 by operator 240, is clearly shown due to the LED equipped RFID tag 210 of the present invention.

Various embodiments of the present invention provide other conditions upon which a device powers its LED could easily be configured. Examples include: Tag ID & State, Tag selected/not selected, Tag read/unread, Tag enabled/not enabled, Tag asleep/awake, Tag damaged/functional, By type of product that tag is attached to, By data stored in flash memory on device, Sensory State, Dropped or broken, Upside down, Temperature level exceeded, Temporal State, Shelf life expired or near expiration, Product should be replaced, refreshed, plant watered, animal fed, Embodiment 1: Tag keeps track of time, Embodiment 2: Tag keeps time threshold, reader provides time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus, comprising:
    a wirelessly-powered radio frequency identification (RFID) tag with at least one light emitting diode (LED) that is powered by said RFID's power harvesting circuit in response to a tag specific illumination command;
    controllers to control the illumination state of said at least one LED and to automatically localize the RFID tag associated with a blinking LED by performing the action of filtering to accentuate intensity discontinuities and deemphasizes linear or flat regions, thresholding to ensure that only bright red light sources are considered, K-means clustering to ensure that only sufficiently large regions are considered, and selecting pixels whose on-off rate is within a given range;
    wherein said wirelessly-powered RFID tag powers said LED to provide bright duty-cycled illumination by discharging a storage capacitor when a sufficient operating voltage is reached.

2. The apparatus of claim 1, wherein said wirelessly-powered RFID tag is interrogated by an RFID reader and reporting a unique identification number by RF backscatter and/or controlling the illumination state of said at least one LED.

3. The apparatus of claim 2, wherein said illumination is controlled either by an explicit LED-control command from said RFID reader, or locally by said wirelessly-powered RFID tag.

4. The apparatus of claim 3, wherein said LED is configured to provide visual feedback to a human operator.

5. The apparatus of claim 1, wherein when the minimum operating voltage is reached, the LED is turned off, at which point the storage capacitor recharges.

6. An apparatus, comprising:
a wirelessly-powered radio frequency identification (RFID) tag with at least one light emitting diode (LED) that is powered by said RFID's power harvesting circuit in response to a tag specific illumination command and is to light up when the tag is in the range of an RFID reader;
controllers to control the illumination state of said at least one LED and to automatically localize the RFID tag associated with a blinking LED by performing the action of filtering to accentuate intensity discontinuities and deemphasizes linear or flat regions, thresholding to ensure that only bright red light sources are considered, K-means clustering to ensure that only sufficiently large regions are considered, and selecting pixels whose on-off rate is within a given range;
wherein said wirelessly-powered RFID tag powers said LED to provide bright duty-cycled illumination by discharging a storage capacitor when a sufficient operating voltage is reached.

7. The apparatus of claim 6, wherein said wirelessly-powered RFID tag is interrogated by an RFID reader and reporting a unique identification number by RF backscatter and controlling the illumination state of said at least one LED.

8. The apparatus of claim 7, wherein said illumination is controlled either by an explicit LED-control command from said RFID reader, or locally by said wirelessly-powered RFID tag.

9. The apparatus of claim 8, wherein said LED is configured to provide visual feedback to a human operator.

10. The apparatus of claim 6, wherein when the minimum operating voltage is reached, the LED is turned off, at which point the storage capacitor recharges.

11. An apparatus, comprising:
a wirelessly-powered radio frequency identification (RFID) tag with at least one light emitting diode (LED) to be powered by a power harvesting circuit for the wirelessly-powered RFID tag, wherein the LED is powered in response to a tag specific illumination command and wherein said wirelessly-powered RFID tag powers said LED to provide bright duty-cycled illumination by discharging a storage capacitor when a sufficient operating voltage is reached, and
controllers to control the illumination state of said at least one LED and to automatically localize the RFID tag associated with a blinking LED by performing the action of filtering to accentuate intensity discontinuities and deemphasizes linear or flat regions, thresholding to ensure that only bright red light sources are considered, K-means clustering to ensure that only sufficiently large regions are considered, and selecting pixels whose on-off rate is within a given range;
wherein localizing the RFID tag is done with a blink detection algorithm or a stereo triangulation algorithm.

12. The apparatus of claim 11, wherein said wirelessly-powered RFID tag is interrogated by an RFID reader and reporting a unique identification number by RF backscatter and controlling the illumination state of said at least one LED.

13. The apparatus of claim 12, wherein said illumination is controlled either by an explicit LED-control command from said RFID reader, or locally by said wirelessly-powered RFID tag.

14. The apparatus of claim 13, wherein said LED is configured to provide visual feedback to a human operator.

15. The apparatus of claim 11, wherein when the minimum operating voltage is reached, the LED is turned off, at which point the storage capacitor recharges.

* * * * *